United States Patent
Lee et al.

(10) Patent No.: US 9,762,279 B2
(45) Date of Patent: Sep. 12, 2017

(54) ADJUSTABLE PROTECTIVE COVER FOR AN INPUT DEVICE

(71) Applicant: Logitech Europe S.A., Lausanne (CH)

(72) Inventors: Chia Feng Lee, Taichung (TW); Chien-Chang Lee, Bade (TW)

(73) Assignee: Logitech Europe S.A., Lausanne (CH)

(*) Notice: Subject to any disclaimer, the term of this patent is extended or adjusted under 35 U.S.C. 154(b) by 0 days.

(21) Appl. No.: 14/870,921

(22) Filed: Sep. 30, 2015

(65) Prior Publication Data
US 2016/0134322 A1 May 12, 2016

Related U.S. Application Data

(60) Provisional application No. 62/077,135, filed on Nov. 7, 2014.

(51) Int. Cl.
| | |
|---|---|
| *H04M 1/00* | (2006.01) |
| *H04B 1/3888* | (2015.01) |
| *A45C 11/00* | (2006.01) |
| *H04B 1/3877* | (2015.01) |
| *H04M 1/04* | (2006.01) |
| *H04M 1/02* | (2006.01) |

(52) U.S. Cl.
CPC ............ *H04B 1/3888* (2013.01); *A45C 11/00* (2013.01); *H04B 1/3877* (2013.01); *H04M 1/04* (2013.01); *A45C 2011/003* (2013.01); *A45C 2200/15* (2013.01); *H04M 1/0216* (2013.01)

(58) Field of Classification Search
CPC ..... H04B 1/3888; H04B 1/3877; A45C 11/00; A45C 2011/003; A45C 2200/15; H04M 1/0216; H04M 1/04
USPC ................. 455/575.8, 575.1, 550.1
See application file for complete search history.

(56) References Cited

U.S. PATENT DOCUMENTS

| | | | | |
|---|---|---|---|---|
| 2012/0285859 | A1* | 11/2012 | Law | G06F 1/1626 206/736 |
| 2013/0075281 | A1 | 3/2013 | Diebel et al. | |
| 2013/0241381 | A1 | 9/2013 | Hynecek et al. | |
| 2013/0313142 | A1 | 11/2013 | Wen | |
| 2014/0085814 | A1* | 3/2014 | Kielland | A45F 3/02 361/679.55 |
| 2014/0091174 | A1 | 4/2014 | Butler | |
| 2014/0311927 | A1* | 10/2014 | Kang | B65D 5/5206 206/45.28 |

(Continued)

FOREIGN PATENT DOCUMENTS

| | | |
|---|---|---|
| DE | 102015118392 | 5/2016 |
| EP | 2230437 B1 | 7/2015 |

OTHER PUBLICATIONS

First Office Action dated Jan. 28, 2016 for Chinese Application No. 201520877847.8, 2 pages.

(Continued)

*Primary Examiner* — Khai M Nguyen
(74) *Attorney, Agent, or Firm* — Kilpatrick Townsend & Stockton LLP (57) ABSTRACT

Embodiments of the invention show a tablet cover that folds to provide a stand for the tablet. A friction hinge between two sections of the tablet cover provides sufficient friction to maintain the stand at the desired angle. In order to allow the cover to be easily flattened after use, a release mechanism is provided in the friction hinge.

12 Claims, 9 Drawing Sheets

(56) References Cited

U.S. PATENT DOCUMENTS

2016/0161988 A1* 6/2016 Reymond ............. G06F 1/1618
  455/575.8

OTHER PUBLICATIONS

Second Office Action dated Mar. 31, 2016 for Chinese Application No. 201520877847.8, 1 page.
DE Examination Report dated Jul. 18, 2016 for German Application No. 102015118392.7, 9 pages.

* cited by examiner

ADJUSTABLE PROTECTIVE COVER FOR AN INPUT DEVICE

CROSS-REFERENCES TO RELATED APPLICATIONS

This application claims the benefit of and priority to U.S. Provisional Application Ser. No. 62/077,135, filed Nov. 7, 2014 and entitled "Adjustable Protective Cover for an Input Device," the contents of which are incorporated by reference.

BACKGROUND OF THE INVENTION

The present invention relates to cases or covers for input devices, and in particular in embodiments to cases or covers that fold to provide a stand for a tablet computer.

A variety of designs have been developed for such cases. For example, Speculative Product Design US Published Application No. 20120285859 shows a tablet cover with a friction hinge at an edge of the cover. US Published Application No. 20130313142 shows a tablet cover with an intermediate hinge on an arm of the cover. Other examples of a case that folds to form a tablet stand include InCase Designs US Published Application No. 20130075281, Speculative Product Design US Published Application No. 20130241381, and Marware US Published Application No. 20140291174.

There is a need for a case/stand that is easy for a user to manipulate, and which is sturdy enough to allow typing on a supported tablet without the tablet bouncing back and forth.

BRIEF SUMMARY OF THE INVENTION

Embodiments of the invention show a device cover that folds to provide a stand for the device (e.g., a tablet computer). A friction hinge between two sections of the cover provides sufficient friction to maintain the stand at the desired angle. In order to allow the cover, with a hinge in the middle, to be easily flattened after use, a release mechanism or detent is provided in the friction hinge.

In one embodiment, the release mechanism is a non-circular portion on the hinge axle which engages a similar non-circular surface on a hinge sleeve. In one embodiment, the non-circular portions are flat, and engage each other when the first and second top cover sections are at an angle of 150 degrees or greater, or around 170 degrees or greater.

In one embodiment, the top cover folds 180 degrees around an edge to move from covering the table display to the back of the tablet. The upper portion of the cover then folds down around the friction hinge to create a stand. The lower portion of the cover is up against the bottom surface of the tablet, where a keyboard display may appear on the tablet. There are magnets in this top cover that engage the bottom of the case to hold it firmly in place during typing or touch input.

DETAILED DESCRIPTION OF THE INVENTION

Figure 1:
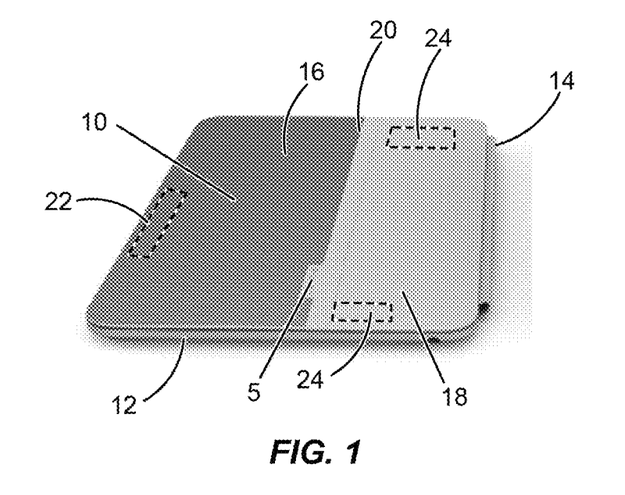
FIG. 1 is a diagram illustrating a cover according to an embodiment of the invention, showing it enclosing a tablet.
Figure 2:
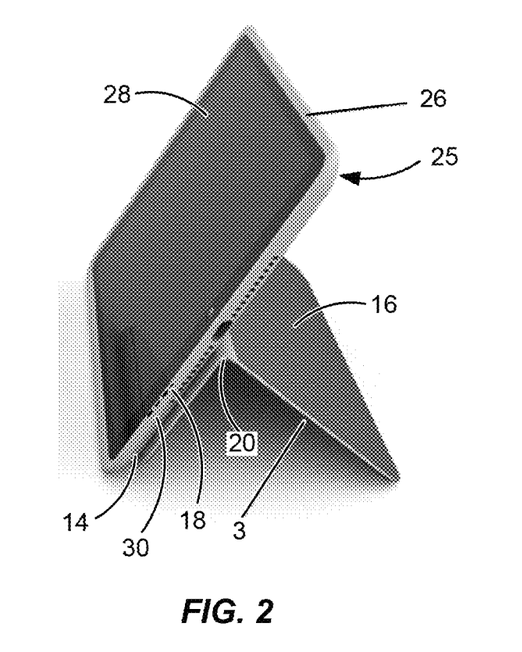
FIG. 2 is a diagram illustrating a cover according to an embodiment of the invention, showing it folded to act as a stand.

FIG. 1 is a diagram illustrating a case according to an embodiment of the invention, showing it enclosing a tablet. The case has a top cover 10, a bottom cover 12 and a flexible side hinge 14. The top cover 10 has two top sections 16 and 18 joined along a hinged axis 20. The top cover sections 16 and 18 are plastic plates covered by an outer fabric or textile. A magnet 22, shown in phantom, holds the top cover 10 closed against an enclosed tablet. Magnets 24 on top cover section 18, shown in phantom, provide an upward magnetic force used in the folded, stand position as illustrated in FIG. 2. Magnets 22 and 24 are internal to the top cover, and thus shown in phantom.

FIG. 2 is a diagram illustrating the case of FIG. 1, showing it folded to act as a stand. The top cover is shown after it has been rotated 180° around hinge 14 so that section 18 of the top cover is adjacent the underside bottom of the case. The bottom 25 of the case is covered with polyurethane and includes a resin bumper 26 around the edges supporting and enclosing a tablet 28. Top section 16 is bent around hinge axis 20 to form a stand. Magnets 24 in section 18 are adjacent a corresponding magnetic element 30 in the case bottom 25 to provide a holding force. This holding force helps firmly hold the bottom of the tablet 28 against the stand, providing stability during a typing operation on a soft keyboard which appears at the bottom of the display of tablet 28. The magnets also allow a user to pick-up the cover and move/reposition it, without the cover releasing from the back of the tablet.

Figure 3:
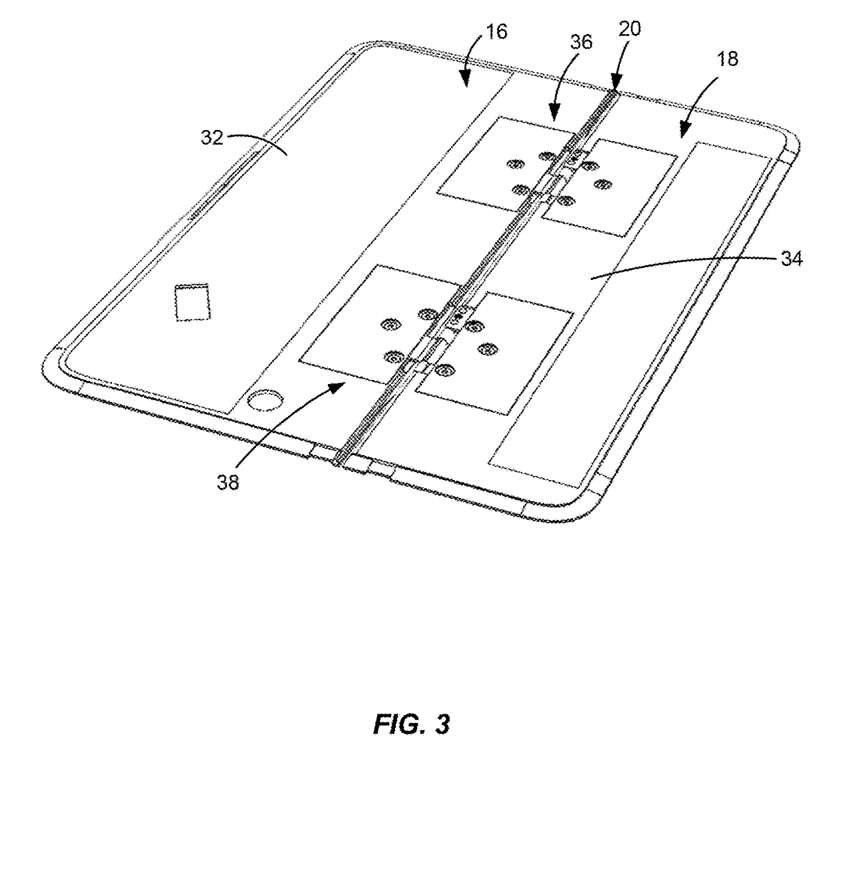
FIG. 3 is a diagram illustrating a top cover according to an embodiment of the invention, showing the hinges.

FIG. 3 is a diagram illustrating the top cover of FIG. 1, without the textile cover, showing the hinges. Plastic supports 32 and 34 are shown forming top cover sections 16 and 18, respectively, without the textile covers. Two metal hinge assemblies 36 and 38 are shown, attached to the plastic supports 32 and 34.

Figure 4:
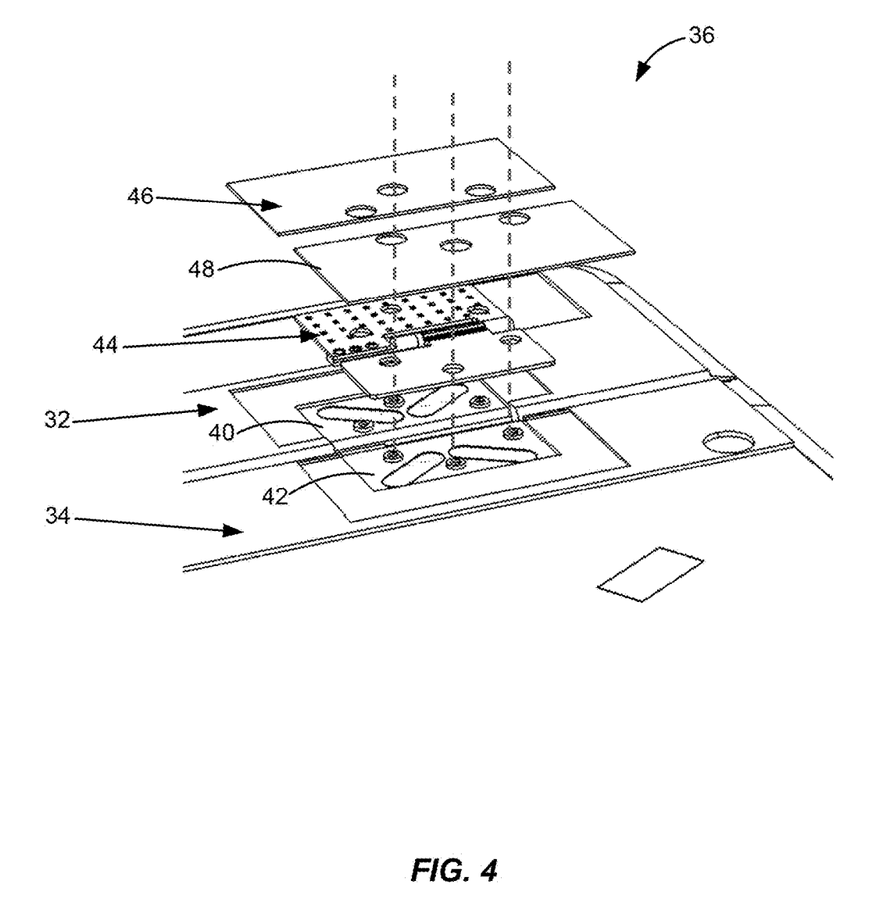
FIG. 4 is a diagram illustrating an exploded view of a hinge structure according to an embodiment of the invention.

FIG. 4 is a diagram illustrating an exploded view of a hinge assembly of FIG. 3. Hinge assembly 36 includes structures 40 and 42 in plastic supports 32 and 34 with depressions and holes for accepting the hinge, hinge cover, and fasteners. A hinge 44 is mounted in structures 40 and 42. Aluminum covers 46 and 48 are mounted over hinge 44. Screws, not shown, fasten the assembly together through the screw holes.

Figure 5:
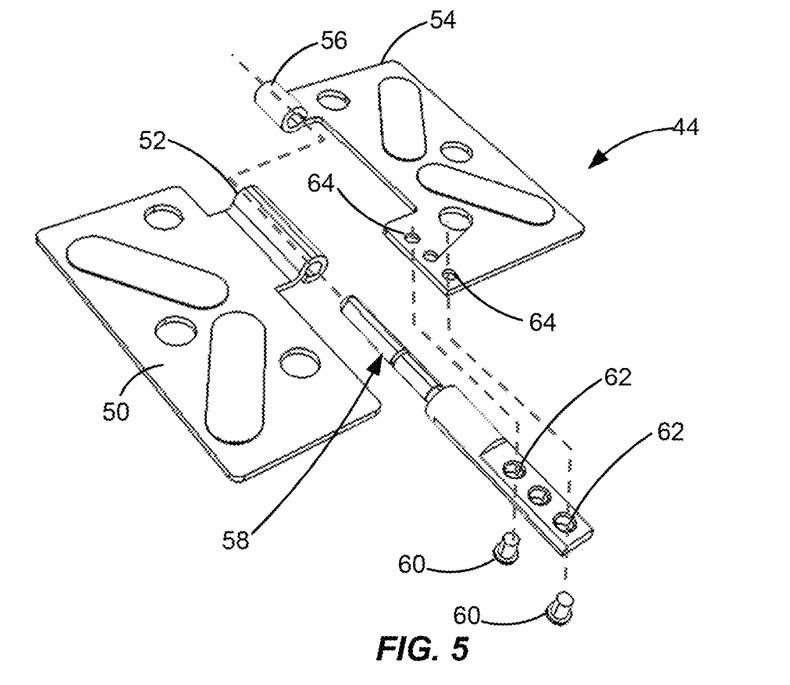
FIG. 5 is a diagram illustrating a disassembled hinge according to an embodiment of the invention, showing the hinge sleeve and axle.

FIG. 5 is a diagram illustrating a disassembled hinge according to an embodiment of the invention, showing the hinge sleeve and axle. Hinge 44 includes a metal plate 50 having a sleeve 52 formed by folding an extension of the metal plate. A second metal plate 54 includes a smaller sleeve 56. An axle 58 is inserted into the sleeves and is fastened to plate 54 using rivets 60 through holes 62 in axle 58 and holes 64 in plate 54.

Figure 6:
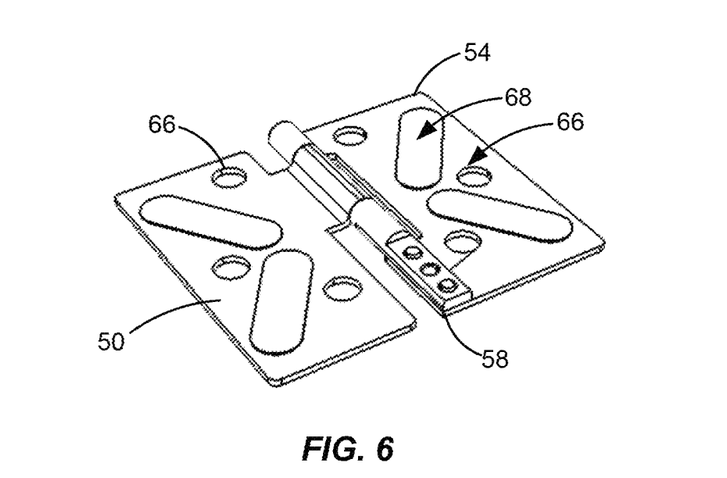
FIG. 6 is a diagram illustrating an assembled hinge according to an embodiment of the invention.

FIG. 6 is a diagram illustrating an assembled hinge according to the embodiment of FIG. 5. FIG. 6 shows the assembled structure with plate 50 joined with plate 54 using axle 58. Screw holes 66 are shown for fastening the structure to the plastic support shown in FIG. 4. Also shown are positioning features 68 for engaging with similar features in the plastic supports.

Figure 7:
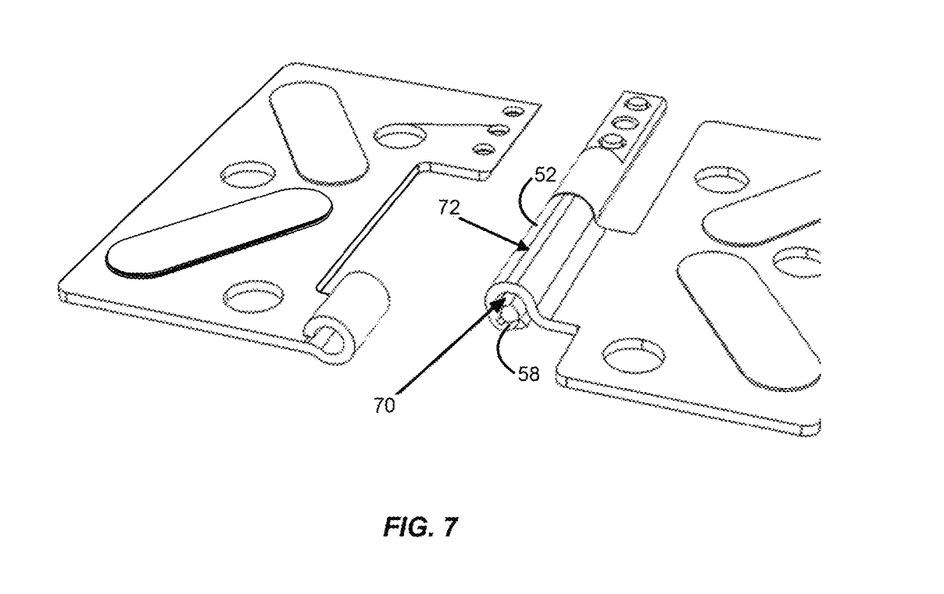
FIG. 7 is a diagram illustrating a partially disassembled hinge according to an embodiment of the invention, showing the flat portions of the hinge sleeve and axle.

FIG. 7 is a diagram illustrating a partially disassembled hinge according to an embodiment of the invention, showing the flat portions of the hinge sleeve and axle. FIG. 7 shows axle 58 having a flat area 70 along its top, which engages with a flat portion 72 in hinge sleeve 52. When the flat areas are engaged with each other, the hinge assembly is held in a flat position. As the axle turns, and the flat portion comes in contact with a circular inside portion of sleeve 52, there is friction which provides the friction hinge force. As the axle is turned back towards the flat portion 72 of sleeve 52, when it gets within a small number of degrees, such as 10°, it will snap into position to be aligned with flat area 52, releasing the friction. This provides a release mechanism or detent, and makes it easy to arrange the hinge plates, and thus the two sections of the cover, in a completely flat position.

Figure 8:
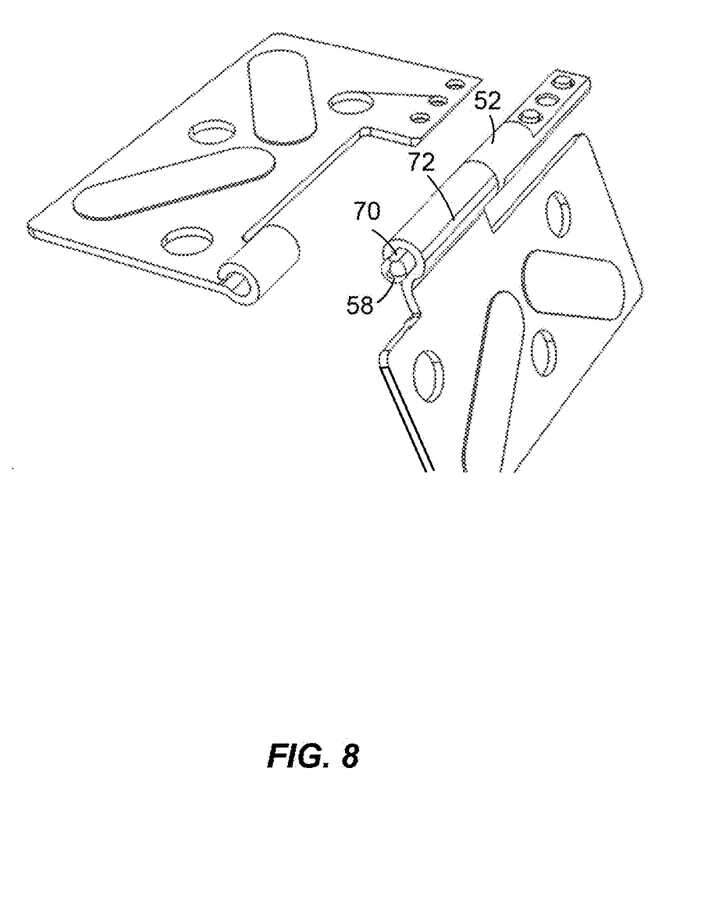
FIG. 8 is a diagram illustrating the partially assembled hinge of FIG. 7, showing the hinge partially rotated.

FIG. 8 is a diagram illustrating the partially assembled hinge of FIG. 7, showing the hinge partially rotated. In the position shown in FIG. 8, flat portion 72 of sleeve 52 has rotated away from flat portion 70 of hinge axle 58, thus providing a friction holding force.

Figure 9:
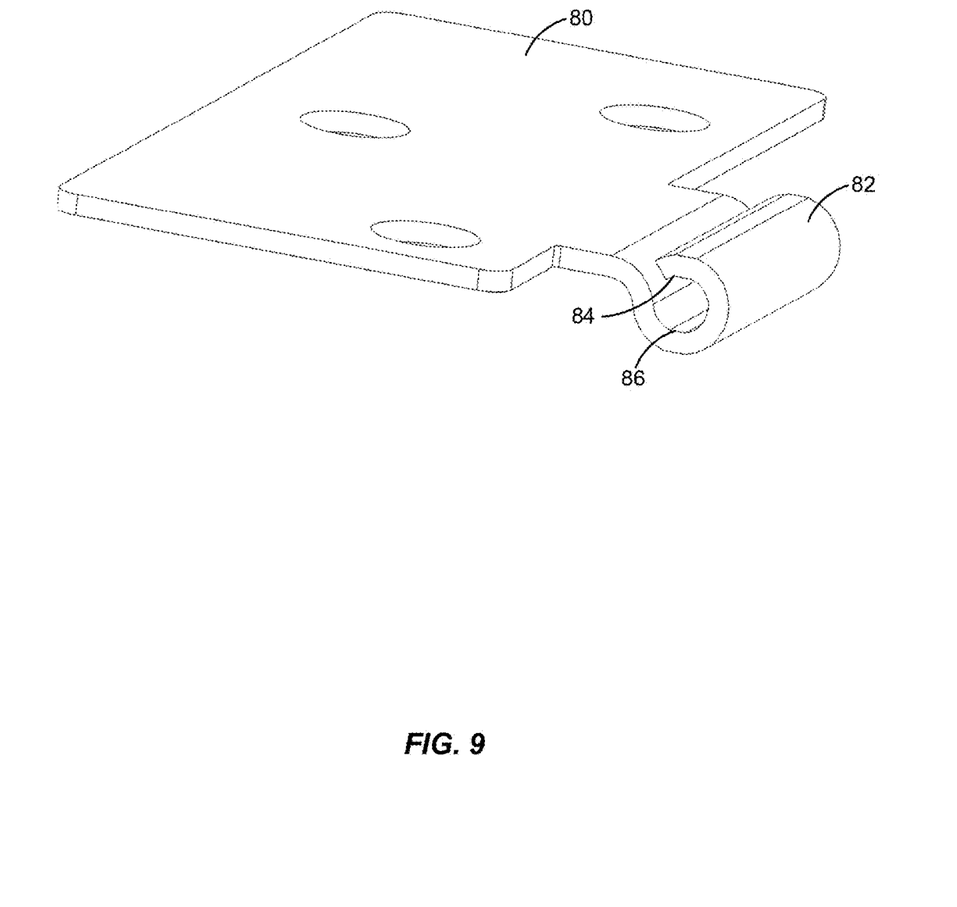
FIG. 9 is a diagram illustrating a hinge plate according to an embodiment of the invention.

FIG. 9 is a diagram illustrating the hinge plate with two opposed flat portions. FIG. 9 shows a hinge plate 80 with a sleeve 82 having a top flat portion 84 with a corresponding, opposite flat portion 86. These two, opposite flat portions engage flat portions on the top and bottom of the axle, which reinforces the release force and the stability by having applied both the top and bottom simultaneously.

Figure 10:
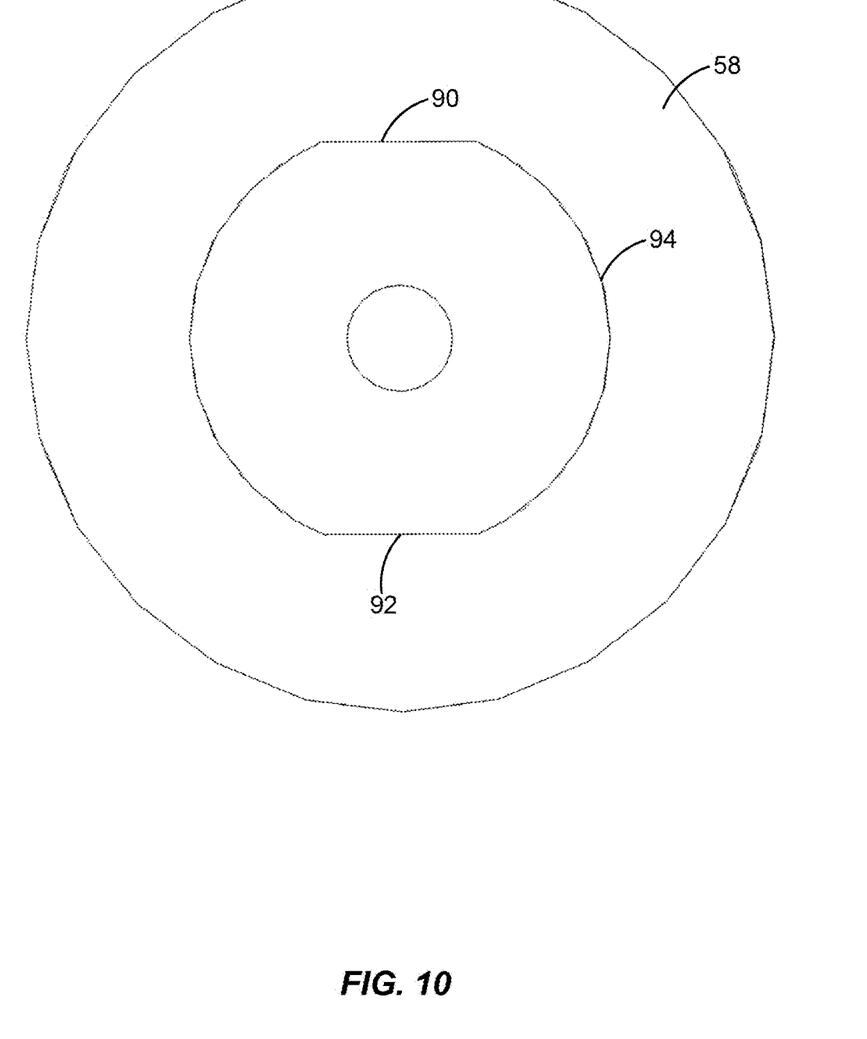
FIG. 10 is a diagram illustrating a cross-section of the hinge axle according to an embodiment of the invention, showing opposite flat portions.

FIG. 10 is a diagram illustrating a cross-section of the hinge axle according to an embodiment of the invention, showing opposite flat portions. Axle 58 includes a top flat portion 90 and bottom flat portion 92. These engage the corresponding flat portions 84 and 86 of the hinge sleeve shown in FIG. 9. In between flat portions 90 and 92, the axle is circular, such as in a position 94, to correspondingly engage with the circular inside portions of the hinge sleeve.

Figure 11A:
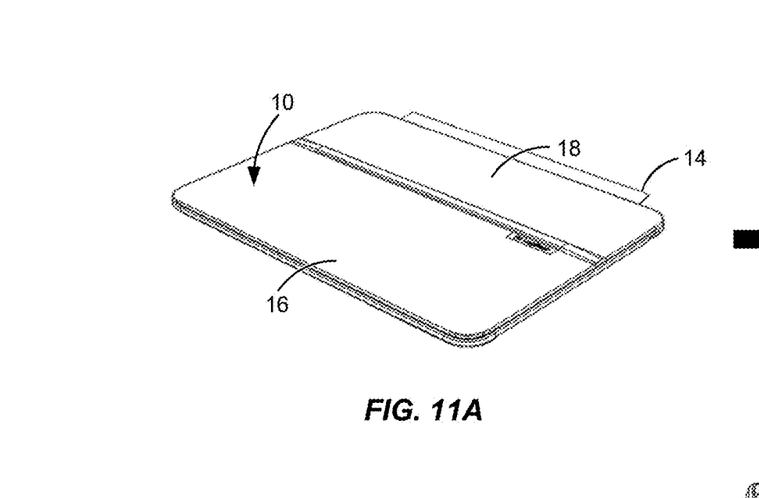
FIG. 11A is a diagram illustrating aspects for a sequence of opening a cover according to an embodiment of the invention and folding it into a stand position.

FIGS. 11A-E illustrate a sequence of opening a cover according to an embodiment of the invention and folding it into a stand position. FIG. 11A shows the top cover 10 with sections 16 and 18 and a side hinge 14 as shown in FIG. 1.

Figure 11B:
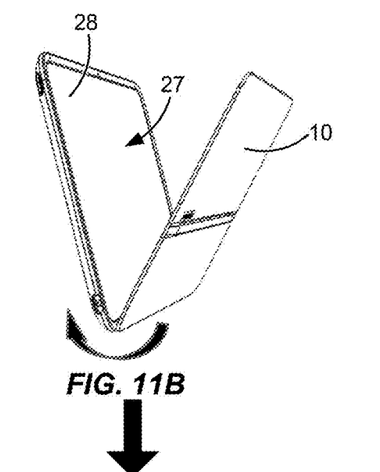
FIG. 11B is a diagram illustrating aspects for a sequence of opening a cover according to an embodiment of the invention and folding it into a stand position.
Figure 11C:
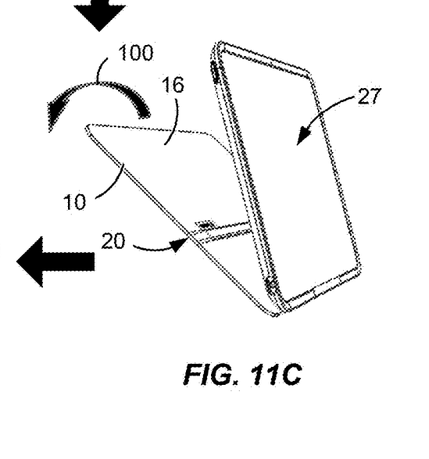
FIG. 11C is a diagram illustrating aspects for a sequence of opening a cover according to an embodiment of the invention and folding it into a stand position.

FIG. 11B shows the top cover starting to be folded away from the display 27 of tablet 28. FIG. 11C shows the top cover folded nearly 360° so that is close to the back of the tablet, on the opposite side from display 27. As illustrated by arrow 100, the next step is to fold top portion 16 around axis 20.

Figure 11D:
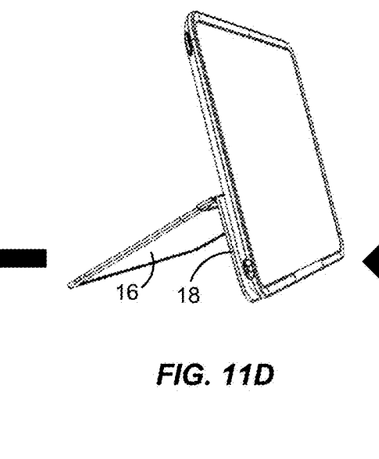
FIG. 11D is a diagram illustrating aspects for a sequence of opening a cover according to an embodiment of the invention and folding it into a stand position.
Figure 11E:
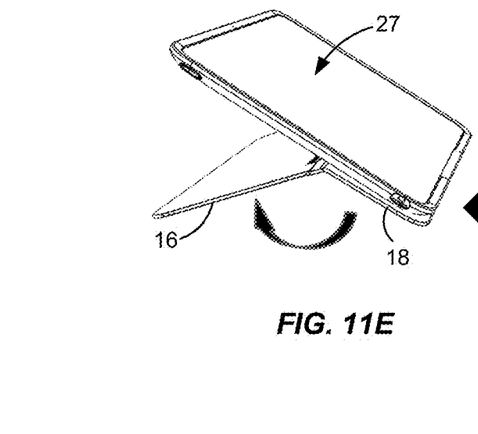
FIG. 11E is a diagram illustrating aspects for a sequence of opening a cover according to an embodiment of the invention and folding it into a stand position.

FIG. 11D shows top cover section 16 folded down at an angle to support the tablet against section 18 of the top cover. FIG. 11E shows sections 16 and 18 at a wider angle, allowing the display 27 of the tablet to be angled farther downward, closer to a flat position.

Various other embodiments are possible within the scope of the appended claims. For example, instead of flat portions on the axle and sleeve, different non-circular shapes could be used, such as a pyramid, saw-tooth, non-circular curve, etc. The hinge axle and the hinge sleeve could have additional non-circular portions for supporting the hinge assembly in a released or detent position at angles other than a flat, 180° angle. For example, two additional flat portions could be added to allow the structure to snap into and be stable at a desired, optimum viewing angle. Alternately, one hinge assembly can have up and down opposite flat structures, while the second hinge assembly can have the flat structures at the desired angle. In another embodiment, more than two detent or release angles are possible.

The fabric covering the top cover on the outside is ideally a fabric which can stretch and extend as the two sections are bent to form the stand. Conversely, a fabric or material on the inner surface of the top cover can have properties of easily compressing when folded and then returning to its original shape when laid flat again.

In one embodiment, the axis of the top cover is located somewhere between the middle of the cover and the bottom part of the cover. Having section 16 wider than section 18 allows section 16 to bend down to the support surface and hold the tablet at a variety of angles. Section 18 is wide enough to provide support against at least most of the virtual keyboard on the tablet display.

In one embodiment, the frictional force is designed to be around 2×3.6++/−0.4 kg/m, to provide sufficient standing force to hold the position of the tablet, while being a small enough force to allow a user to unfold and fold the cover without undue effort.

What is claimed is:

1. A device cover comprising:
   a top cover having a first side edge and a second side edge of the top cover, joining first and section sections of the top cover;
   an intermediate hinge mounted between the first side edge and a second side edge of the top cover, joining the first and second sections of the top cover, the intermediate hinge being a friction hinge; and
   a release mechanism in said intermediate friction hinge, the release mechanism substantially releasing the friction force of the intermediate hinge when the hinge angle joining the first and second sections is less than a predetermined angle.

2. The device cover of claim 1 wherein said release mechanism comprises:
   a hinge axle having a circular cross-section with a first non-circular axle portion; and
   a sleeve for the hinge axle, the sleeve having a circular cross-section with a first non-circular sleeve portion matching the first non-circular hinge portion;

wherein the non-circular portions engage each other when the hinge is substantially flat, with the first and second top cover sections in substantially the same plane.

3. The device cover of claim 2 wherein the non-circular portions engage each other when the first and second top cover sections are at an angle of 150 degrees or greater.

4. The device cover of claim 2 wherein the non-circular portions engage each other when the first and second top cover sections are at an angle of 170 degrees or greater.

5. The device cover of claim 2 wherein the non-circular portions are flat portions.

6. The device cover of claim 2 further comprising:
a second non-circular hinge portion on the hinge axle opposite the first non-circular hinge portion; and
a second non-circular sleeve portion the sleeve opposite the first non-circular sleeve portion.

7. The device cover of claim 2 further comprising:
at least a third non-circular hinge portion on the hinge axle at another angle; and
at least a third non-circular sleeve portion the sleeve opposite the first non-circular sleeve portion.

8. The device cover of claim 1 further comprising:
a bottom cover connected at an edge to the top cover by a flexible material hinge permitting the top cover to rotate 360 degrees to contact the device cover on an opposite side;
a first magnetic element in the top cover; and
a second magnet element in the bottom cover, positioned to interact with the first magnetic element to hold the top cover when rotated nearly 360 degrees.

9. The device cover of claim 8 further comprising:
first and second supports mounted in the top and bottom covers, respectively;
a textile cover over the first plastic support of the top cover; and
a polyurethane cover over the second plastic support of the bottom cover, a portion of the polyurethane cover extending to form the flexible material hinge plane.

10. The device cover of claim 1 wherein the first section is wider than the second section in a direction perpendicular to an axis of the intermediate hinge.

11. The device cover of claim 10 wherein the first section is at least 1.5 times wider than the second section.

12. A device cover comprising:
a top cover having a first side edge and a second side edge of the top cover, joining first and section sections of the top cover;
an intermediate hinge mounted between the first side edge and a second side edge of the top cover, joining the first and second sections of the top cover, the intermediate hinge being a friction hinge;
wherein the first section is wider than the second section in a direction perpendicular to an axis of the intermediate hinge;
a release mechanism in said intermediate friction hinge, the release mechanism substantially releasing the friction force when the hinge angle joining the first and second sections is less than a predetermined angle, wherein said release mechanism comprises:
a hinge axle having a circular cross-section with a first flat axle portion; and
a sleeve for the hinge axle, the sleeve having a circular cross-section with a first flat sleeve portion matching the first flat hinge portion;
wherein the flat portions engage each other when the hinge is substantially flat, at an angle of 170 degrees or greater;
a bottom cover connected at an edge to the top cover by a flexible material hinge permitting the top cover to rotate 360 degrees to contact the device cover on an opposite side;
a first magnetic element in the top cover; and
a second magnet element in the bottom cover, positioned to interact with the first magnetic element to hold the top cover when rotated nearly 360 degrees.

\* \* \* \* \*